US012053866B1

(12) United States Patent
Threadgill

(10) Patent No.: US 12,053,866 B1
(45) Date of Patent: Aug. 6, 2024

(54) PLUMBING TOOL

(71) Applicant: Charles E. Threadgill, Tulsa, OK (US)

(72) Inventor: Charles E. Threadgill, Tulsa, OK (US)

( * ) Notice: Subject to any disclaimer, the term of this patent is extended or adjusted under 35 U.S.C. 154(b) by 0 days.

(21) Appl. No.: 18/448,574

(22) Filed: Aug. 11, 2023

(51) Int. Cl.
*B25B 27/30* (2006.01)
*E03C 1/04* (2006.01)

(52) U.S. Cl.
CPC ................ *B25B 27/30* (2013.01); *E03C 1/04* (2013.01)

(58) Field of Classification Search
CPC ....... B25B 27/24; B25B 27/023; B25B 27/30; E03C 1/04
See application file for complete search history.

(56) References Cited

U.S. PATENT DOCUMENTS

| | | | | |
|---|---|---|---|---|
| 2,331,920 | A | 10/1943 | McMaster | |
| 3,553,817 | A | 1/1971 | Lallak | |
| 3,584,365 | A | 6/1971 | Cuen et al. | |
| 4,079,494 | A * | 3/1978 | Sutton | B25B 27/02 29/280 |
| 5,119,556 | A * | 6/1992 | Hseu | B25B 27/023 29/213.1 |
| 5,299,347 | A | 4/1994 | Decker | |
| 5,682,660 | A * | 11/1997 | Hansen | F41B 5/14 29/281.6 |
| 6,257,099 | B1 * | 7/2001 | Rosenbaum | B25B 13/48 81/176.15 |
| 6,698,317 | B1 * | 3/2004 | Machovsky | B25B 13/02 81/177.5 |
| 7,062,827 | B2 | 1/2006 | Bates | |
| 8,925,167 | B1 * | 1/2015 | Miller | B25B 27/023 29/256 |
| 9,144,898 | B1 | 9/2015 | Davis, Jr. | |
| 9,302,374 | B1 * | 4/2016 | Cusenza | B25B 13/58 |
| 9,387,576 | B1 * | 7/2016 | Davis, Jr. | B25B 27/24 |
| 11,338,419 | B1 * | 5/2022 | Roston | B25B 27/24 |
| 2004/0238036 | A1 | 12/2004 | Byers | |
| 2006/0081094 | A1 * | 4/2006 | Ludwig | B25B 13/48 81/176.15 |
| 2006/0213014 | A1 * | 9/2006 | Manske | B25B 15/02 7/165 |

(Continued)

OTHER PUBLICATIONS

Equiparts Corporation, Seat and Spring Removal/Installation Tool, https://store.equiparts.net/38197-seat-spring-removal-installation-tool.html (publication unknown).

*Primary Examiner* — Seahee Hong
(74) *Attorney, Agent, or Firm* — Margaret S. Millikin

(57) ABSTRACT

A tool and method for replacing or installing components in a confined, interior space of a plumbing faucet valve assembly. The tool comprises a hollow body having a first end and a second end. The first end has an inner diameter and an outer diameter, and the second end has an inner diameter and an outer diameter, wherein the outer diameter of the first end is smaller than the outer diameter of the second end, thus forming a lip or flange proximal the first end for a purpose of engaging a plumbing faucet component for ease of installation during repair or replacement of the component in a plumbing faucet. The tool is manipulated by simply sliding it over the shaft of a screwdriver or other implement during operation. The tool facilitates proper alignment and installation of the replacement components into the confined interior space of the faucet.

15 Claims, 4 Drawing Sheets

(56) References Cited

U.S. PATENT DOCUMENTS

| | | | | |
|---|---|---|---|---|
| 2013/0160264 | A1* | 6/2013 | Reyes | B25B 13/488 29/278 |
| 2018/0015598 | A1 | 1/2018 | Siddall, Jr. | |
| 2018/0056715 | A1* | 3/2018 | Enborg | B25B 23/065 |
| 2021/0308848 | A1* | 10/2021 | Widner | B25B 27/04 |

* cited by examiner

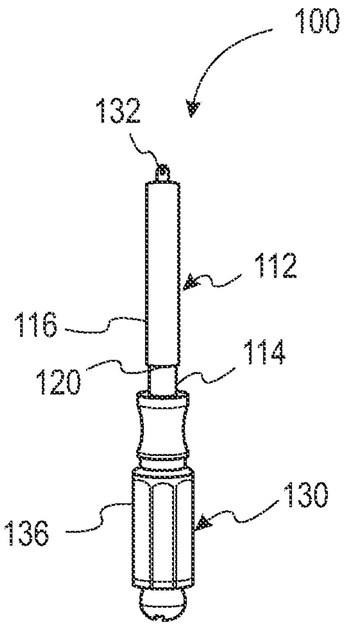
FIG. 6
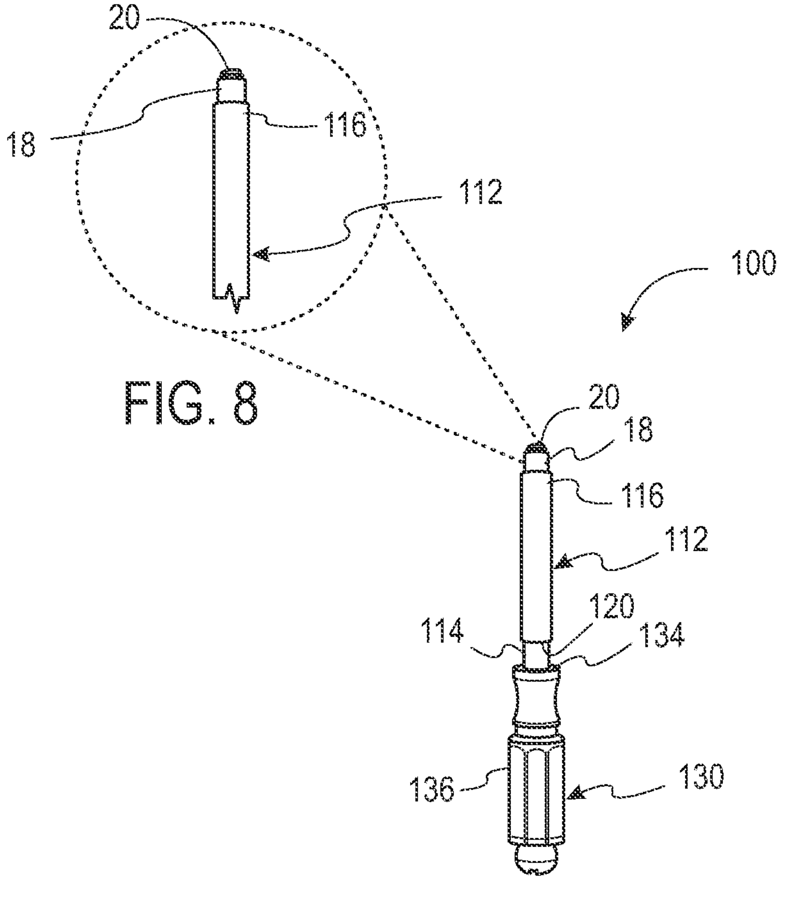
FIG. 8
FIG. 7

PLUMBING TOOL

TECHNICAL FIELD OF THE INVENTION

The present invention relates generally to plumbing tools, and more particularly, but not by way of limitation, to tools for replacing or installing components in the confined, interior space of a plumbing faucet valve assembly. Methods of using plumbing tools also are provided.

SUMMARY OF THE INVENTION

The invention is directed to a plumbing tool for replacing and/or installing interior components of a plumbing faucet, the plumbing tool comprising: a body, the body forming a first end and a second end, wherein the first end has an inner diameter $D_{FEI}$ and an outer diameter $D_{FEO}$, and the second end has an inner diameter $D_{SEI}$ and an outer diameter $D_{SEO}$ and wherein the outer diameter $D_{FEO}$ of the first end is smaller than the outer diameter $D_{SEO}$ of the second end, thus forming a flange proximal the first end, the flange being configured to apply a force, without moving parts of the plumbing tool, against the interior components of the plumbing faucet; the differential between the outer diameter $D_{FEO}$ of the first end and the outer diameter $D_{SEO}$ of the second end is a ratio ranging from about 0.2 to about 0.8; the hollow body is formed from polyethylene (PE), polystyrene (PS), polypropylene, polyvinyl chloride (PVC), polyester, nylon, thermoplastic olefins, santoprene, acrylonitrile butadiene (ABS), acetals, polyoxymethylene, polyvinyl chloride, ultra-high molecular weight polyethylene (UHMWPE), high density polyethylene (HDPE), polytetrafluoroethylene (PTFE), cross-linked polyethylene (PEX), and nylons, nylon 6, nylon 66, nylon 6/6-6, nylon 6/9, nylon 6/10, nylon 6/12, nylon 11, or nylon 12, and combinations of the foregoing; the hollow body forms an interior channel for the purpose of receiving an implement for wielding the plumbing tool; the hollow body has a length $L_B$ and the channel is co-extensive with the length $L_B$ of the hollow body; and the first end has a length $L_{FE}$ and the second end has a length $L_{SE}$ and the ratio of the length $L_{FE}$ of the first end to the length $L_{SE}$ of the second end ranges from about 0.1 to about 0.5 and accommodates the application of force to the flange.

The invention further is directed to a method of replacing and/or installing interior components of a plumbing faucet, the method comprising: selecting a tool having a body, the body forming a first end and a second end, wherein the first end has an inner diameter $D_{FEI}$ and an outer diameter $D_{FEO}$, and the second end has an inner diameter $D_{FEI}$ and an outer diameter $D_{FEO}$ and wherein the outer diameter $D_{FEO}$ of the first end is smaller than the outer diameter $D_{FEO}$ of the second end, thus forming a flange proximal the first end, the flange being configured to apply a force, without moving parts of the plumbing tool, against the interior components of the plumbing faucet, wherein the interior components comprise a seat and a spring; selecting an implement for receiving the tool, the implement having a shaft; and placing the tool over the shaft of an implement with the flange positioned proximal the handle of the implement; placing the interior components of the plumbing faucet over the shaft of the implement; situating the seat and spring proximal the second end of the plumbing tool; inserting the seat and spring into the proper location in the plumbing faucet with the plumbing tool supported on the implement; holding the plumbing tool in place while withdrawing the implement from the plumbing faucet; and applying a force against the flange and holding the plumbing tool inward within the plumbing faucet while withdrawing the implement from the plumbing faucet.

The invention further is directed to a plumbing tool for replacing or installing interior components of a plumbing faucet, the plumbing tool comprising: a hollow body, the hollow body forming a first end and a second end, wherein: the first end has an inner diameter $D_{FEI}$ and an outer diameter $D_{FEO}$, and the second end has an inner diameter $D_{SEI}$ and an outer diameter $D_{SEO}$ and wherein the outer diameter $D_{FEO}$ of the first end is smaller than the outer diameter $D_{SEO}$ of the second end, thus forming a flange proximal the first end, the flange being configured to apply a force, without moving parts, against the interior components of the plumbing faucet; the differential between the outer diameter $D_{FEO}$ of the first end and the outer diameter $D_{SEO}$ of the second end is a ratio ranging from about 0.2 to about 0.8; the hollow body is formed from polyethylene (PE), polystyrene (PS), polypropylene, polyvinyl chloride (PVC), polyester, nylon, thermoplastic olefins, santoprene, acrylonitrile butadiene styrene (ABS), acetals, polyoxymethylene, polyvinyl chloride, ultra-high molecular weight polyethylene (UHMWPE), high density polyethylene (HDPE), polytetrafluoroethylene (PTFE), cross-linked polyethylene (PEX), and nylons, nylon 6, nylon 66, nylon 6/6-6, nylon 6/9, nylon 6/10, nylon 6/12, nylon 11, or nylon 12, and combinations of the foregoing; and the first end and the second end are comprised of different materials.

BRIEF DESCRIPTION OF THE DRAWINGS

FIG. 6 shows an illustrative plumbing tool constructed in accordance with an embodiment of the present invention and supported on a conventional screwdriver.

FIG. 7 shows the illustrative plumbing tool of FIG. 6 with a seat and spring supported on the plumbing tool and ready for installation into the interior of a plumbing faucet.

FIG. 8 is a close-up view of the end of the plumbing tool with the seat and spring supported thereon and ready for installation into the interior of a plumbing faucet.

DETAILED DESCRIPTION OF THE INVENTION

Figure 1A:
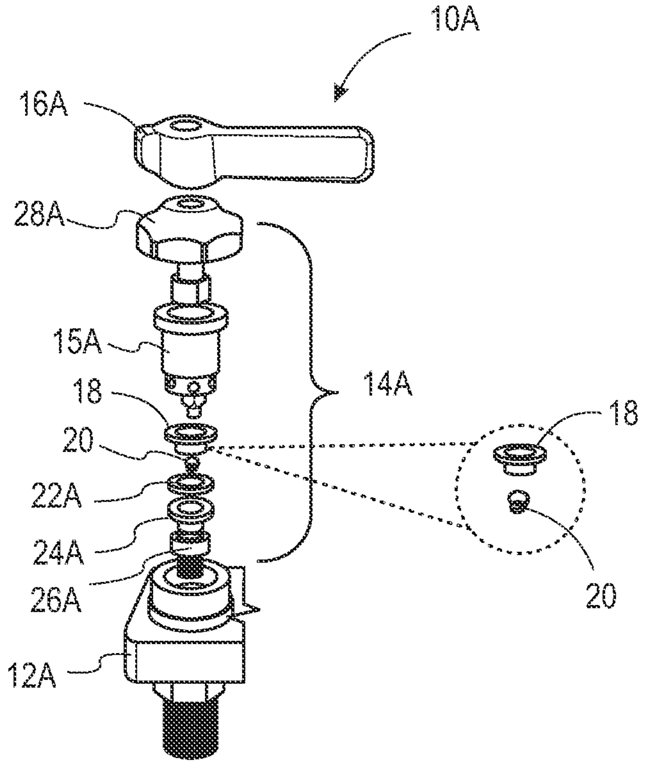
FIG. 1A PRIOR ART
FIG. 1A is an exploded view of an illustrative construction of a conventional plumbing faucet comprising a faucet body and a compression valve.

One of the hardest working appliances in residential homes, commercial offices and in industry is the plumbing faucet. Frequent use, whether from hygiene or hydraulics, causes these water faucets to wear out. Age, excessive wear, and corrosion from rust, dirt, or mineral deposits cause erosion and failure of faucet components. Timely replacement of component parts can defer the expense of a new faucet.

Many water faucets contain a spring-loaded seal, consisting of a seat, typically made of rubber, and a metal seal spring. This combination of a seat and spring regulates the flow of water when the faucet knob is turned. Some types of plumbing valves in faucets employ O-rings or ceramic discs, rather than a seat and spring. When these items become worn the faucet will leak, requiring replacement of the seat and spring. Due to tight working spaces, usually in an uncomfortable cramped position, and the small size of the fixture opening containing the interior components of the faucet, it is desirable to perform this task as efficiently and quickly as possible.

Although the valves in the various types of faucets are different, they all malfunction eventually, and replacement of the faucet valve components can be easily accomplished by amateurs and homeowners, as well as professionals. Due to the variety in the construction and operation of the types of faucets and component parts, a substantial number of types of different tools are required to repair a faucet. For example, when repairing compression or ball valve or cartridge faucets, the following tools may be required: a flat blade screw driver, a Phillips screwdriver, a crescent wrench, and Allen wrench and needle nose pliers. First, the water valve supplying water to the faucet is closed. The water line to the faucet is drained to clear the line of water and relieve any pressure that has built up on the faucet or in the line. The flat blade screw driver removes the caps from the handles of the faucet, and the Phillips screw driver remove the screws holding the handles onto the faucet handle and remove the handles of the cartridge. A crescent wrench is employed to remove the bonnet nut from the cartridge, after which the cartridge is removed. Needle nose pliers may be necessary to remove the cartridge. Soak up any remaining water inside the faucet with a cloth. Looking inside the faucet, the seat and spring are now in view and a screwdriver or an Allen wrench can be used to remove the seat and spring. The seat typically is a rubber seat. The crook of the Allen wrench can be used to catch the seat and the spring and removes them from the faucet. A new seat and a new spring are inserted into the faucet in the same order as removed, either the seat with the spring underneath, or vice versa. Typically, the spring is on the bottom, with the rubber seat acting as a cap. The cartridges are then reinserted and tightened with the crescent wrench, and the bonnet nut screwed on and tightened. Finally, the handles and the caps are snapped back into place.

An Allen wrench is not an ideal tool for replacement of the seat and spring. The correct size of Allen wrench must be used, and the crook of the Allen wrench does not lend itself well to installing the new seat and spring. The seat and spring are difficult to clutch and pull from inside the valve works using an Allen wrench. Moreover, the new seat and spring can misalign when inserting the replacement parts into the faucet in a tight enclosure using a crook of an Allen wrench. It is critical that these replacement components be accurately aligned upon installation.

The present invention provides a novel tool for replacing interior components of a plumbing faucet, such as a seat and spring, O-rings and seats, O-rings, washers and other interior components, and is adaptable for use in a variety of faucet assemblies. The present invention may eliminate the need to supply multiple tools for maintenance of a faucet. The present invention facilitates proper alignment and installation of the new components into the confined interior space of the faucet. Moreover, the present invention simply slides over the shaft of a screwdriver or other implement, thus eliminating the requirement for tracking an additional tool when repairing the faucet. There are no moving parts on the tool itself and no springs, handles or other components that deteriorate or break. The tool is universal, as it can be used with multiple sizes of interior faucet components, such as seats and springs, and with multiple sizes of screwdrivers and other common tools. The tool itself is practically indestructible.

Turning now to the drawings in general, and to FIGS. 1A, 1B, 1C and 1D in particular, there is shown therein four illustrative valve constructions for conventional plumbing faucets comprising four primary types of faucet valves, including a compression valve, a ball valve, a cartridge valve and a ceramic disk valve. The present invention is applicable for use in connection with a variety of different types of valves and in a variety of different valve constructions, including without limitation those shown herein. To facilitate the description of the invention and the utility of the invention, a few illustrative, although not exhaustive, conventional faucet valve constructions comprising four categories of plumbing faucet will be discussed. It will be appreciated that these categories of plumbing faucets, and their illustrative constructions shown in FIGS. 1A, 1B, 1C and 1D, are provided by way of example only, and that the present invention is applicable for use in other types of faucets and/or valve constructions and configurations.

FIG. 1A shows an exploded view of an illustrative construction of a plumbing faucet 10A comprising a faucet body 12A and a compression valve 14A, also called a stem-and-seat faucet valve, in the plumbing faucet. This faucet construction typically employs separate hot and cold water handles and is the oldest and simplest form of valve. The compression valve 14A may comprise a stem 15A, a seat 18, which may or may not form a flange, and spring 20. It controls the flow of water by turning a screw-like handle 16A that compresses the valve 14A against a washer 22A, which is usually made of rubber and comprises varying shapes. The washer 22A may be housed in or positioned adjacent a washer casing 24A and bottom nut 26A. Top nut 28A holds the components of the compression valve 14A in working cooperation. The washer 22A tightens against the seat 18 via the compression action of the spring 20 to seal off the washer 22A from the seat 18, allowing water to flow to the nozzle (not shown) of the faucet 10A. In operation, when the handle 16A is tightened, the stem 15A presses against the valve seat 18 to create compression via the spring 20 against the seat 18 and close off the water flow. These various components, including the seat 18 and spring 20, deteriorate with regular use over time and cause dripping faucets.

Figure 1B:
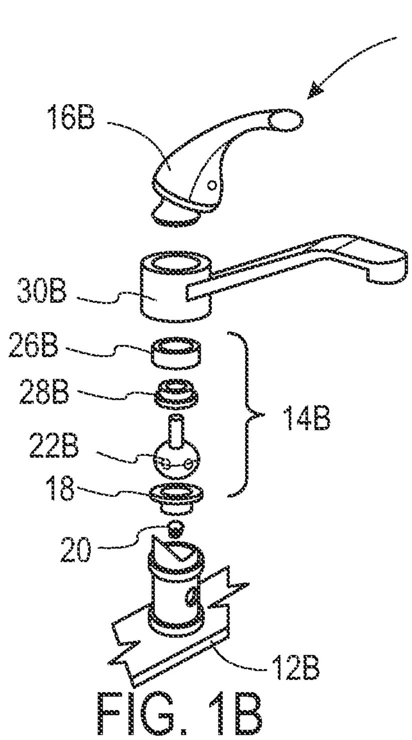
FIG. 1B PRIOR ART
FIG. 1B is an exploded view of an illustrative construction of a conventional plumbing faucet comprising a faucet body and a ball valve.

Turning now to FIG. 1B, there is shown therein an exploded view of an illustrative construction of a plumbing faucet 10B comprising a faucet body 12B and a ball valve 14B in a plumbing faucet. Ball valves often are used in single handle faucets and were the first technological advancement in washer-less faucets. The faucet 10B comprises a single adjustable handle 16B that moves over a round ball or a ball-shaped cap 22B positioned above the base of the faucet body 12B. The ball 22B may be positioned over a rubber seat 18 and spring 20 and works in conjunction with a cam 26B and cam washer 28B. The ball 22B forms interior slots (not shown) which, through the lever motion of the adjustable handle 16B, control the flow of water and the mix of hot and cold water to regulate the temperature of the water emanating from the nozzle 30B.

Figure 1C:
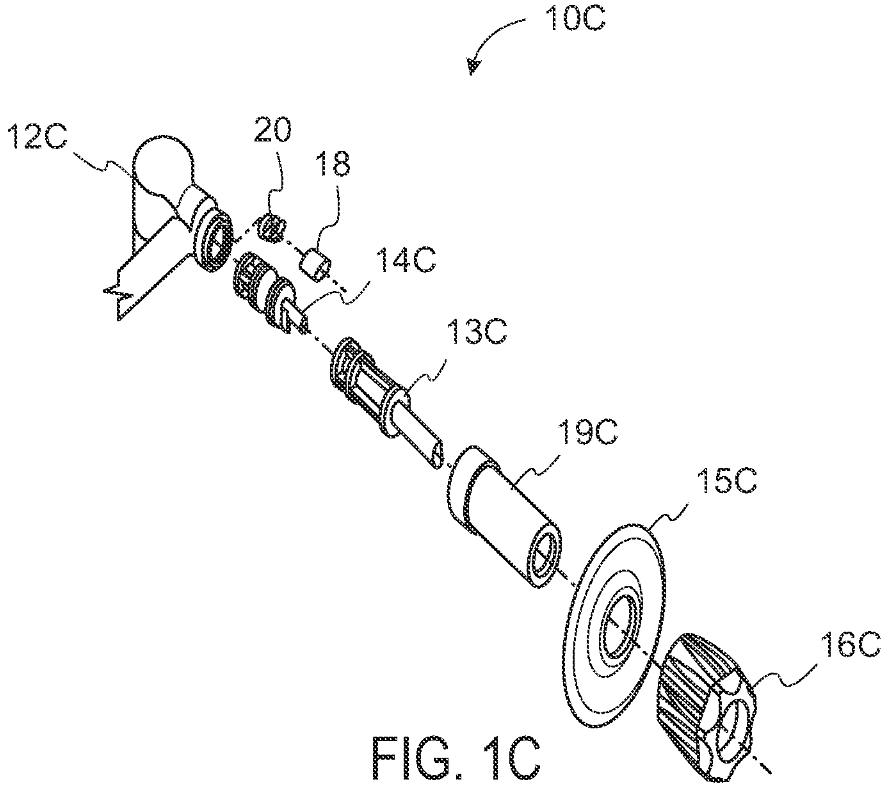
FIG. 1C PRIOR ART
FIG. 1C is an exploded view of an illustrative construction of a conventional plumbing faucet comprising a faucet body and a cartridge valve.

Turning now to FIG. 1C, there is shown therein an exploded view of an illustrative construction of a plumbing faucet 10C comprising a faucet body 12C and a cartridge 14C having a cartridge cover 13C and enclosed by sleeve 19C. This type of wall mounted faucet often, although not exclusively, is used in connection with bathtubs and showers. In some cartridge valves, the cartridge 14C is positioned proximal a seat 18 and spring 20, as shown in FIG. 1C, and in other cartridge valves, the cartridge 14C is positioned proximal a seat 18 and moves to regulate the flow of water, with a mere partial turn of the handle 16C, abutted against escutcheon 15C, without a washer and without compressing the valve. O-rings, not shown, may be used to seal the cartridge 14C. Cartridge valves are less complex and are easier to repair but repairs are more costly. Replacement requires replacing the seat 18, and/or spring 20, and/or O-rings (not shown) and installing a new cartridge 14C. Mineral encrustation can complicate removal of these cartridges.

Figure 1D:
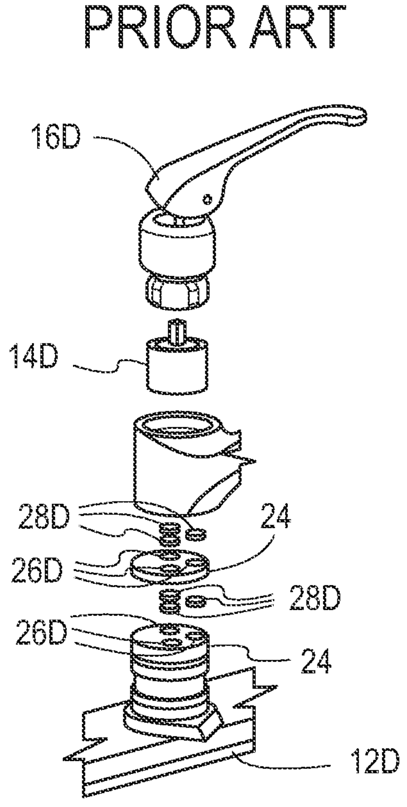
FIG. 1D PRIOR ART
FIG. 1D is an exploded view of an illustrative construction of a conventional plumbing faucet comprising a faucet body and a disk valve.

Turning now to FIG. 1D, there is shown therein an exploded view of an illustrative faucet construction of a ceramic disc plumbing faucet 10D comprising a faucet body 12D and a cartridge 14D. The ceramic disc faucet 10D employs one or more highly polished and wear-resistant ceramic disks 24 that slide across each other. The adjustable handle 16D moves the ceramic disks 24 up and down to regulate the flow of water by opening or restricting the passage of water through a plurality of openings 26D in the ceramic disks 24, fitted with O-rings 28D to seal the openings 26D in the ceramic disks 24. A ceramic disc faucet 10D is easily manipulated and responsive to touch, making it an ideal choice for those with arthritis or disabilities of the hand. Ceramic disk faucets 10D are considered the most durable and long-lasting and, therefore, are more expensive. Nevertheless, component parts, including O-rings 36D, wear out and require repair or replacement, without replacing the faucet.

Figure 2:
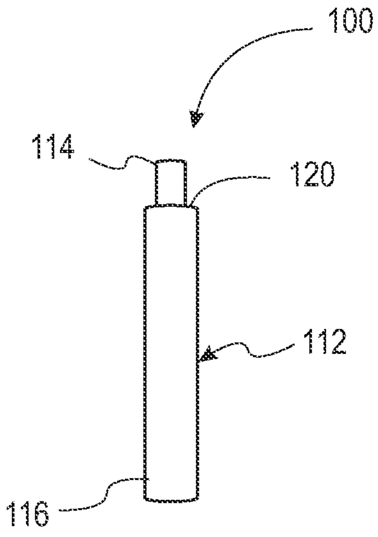
FIG. 2 shows a perspective view of an illustrative plumbing tool constructed in accordance with an embodiment of the present invention.
Figure 3:
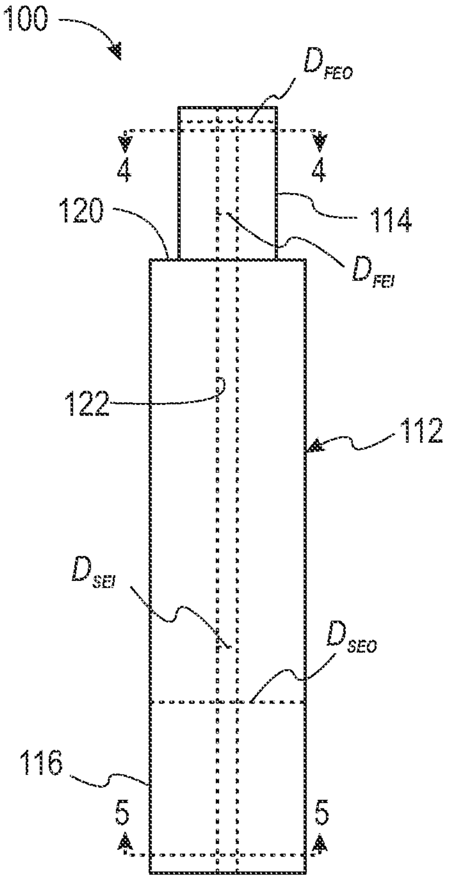
FIG. 3 shows a side view of an illustrative plumbing tool constructed in accordance with an embodiment of the present invention.

Turning now to FIGS. 2 and 3, there is shown therein an illustrative plumbing tool 100 for replacing and installing interior components of plumbing faucets, including, without limitation, plumbing faucets of the type shown in FIGS. 1A, 1B, 1C and 1D. In one embodiment of the invention, the tool 100 is adapted to replace or install a seat 18 and spring 20 in compression valve, ball valve, and lever handle faucets, to the extent present in cartridge valve and disk valve faucets. In another embodiment, the tool 100 also is adapted to replace or install other plumbing faucet components, such as O-rings 26D, washers 22A, and other interior components.

The tool 100 comprises a hollow body 112. The hollow body 112 may be any shape adapted to be received within the interior of a plumbing faucet, such as the plumbing faucets 1A, 1B, 1C or 1D. In one embodiment of the invention, the hollow body 112 is cylindrical, but it will be appreciated that the body 112 may comprise any shape, including segmented cylinder, triangular, hexagon, star-shaped or square, for example. The body 112 is hollow for a purpose yet to be described.

Turning now to FIGS. 3, 4, 5 and 6, but with continuing reference to FIGS. 1 and 2, the body 112 of the tool 100 forms a first end 114 and a second end 116. The first end 114 has an inner diameter $D_{FEI}$ and an outer diameter $D_{FEO}$, and the second end 116 has an inner diameter $D_{SEI}$ and an outer diameter $D_{SEO}$. The outer diameter of the first end $D_{FEO}$ is smaller than the outer diameter of the second end $D_{SEO}$, thus forming a lip or flange 120 proximal the first end 114 for a purpose yet to be described. The inner diameter of the first end $D_{FEI}$ and the inner diameter of the second end $D_{SEI}$ are approximately equal for a purpose yet to be described.

The differential between the outer diameter of the first end $D_{FEO}$ and the outer diameter of the second end $D_{SEO}$ is a ratio of about 0.2 to about 0.8. In one embodiment of the invention, the differential between the outer diameter of the first end $D_{FEO}$ and the outer diameter of the second end $D_{SEO}$ is a ratio of about 0.5 to about 0.6.

The body 112 may be formed from any material suitable for use in plumbing applications, including plastics and metals. In applications where heat is a factor, thermoset plastics such as polyurethane, epoxy, phenolic, and certain polyesters, and combinations thereof, are suitable for us in manufacturing the tool 100. In applications where cost and corrosion concerns are at issue, the tool 100 may be formed from thermoplastics, including polyethylene (PE), polystyrene (PS), polypropylene, polyvinyl chloride (PVC), polyester, nylon, thermoplastic olefins, santoprene, acrylonitrile butadiene styrene (ABS), acetals, polyoxymethylene, polyvinyl chloride, ultra-high molecular weight polyethylene (UHMWPE), high density polyethylene (HDPE), polytetrafluoroethylene (PTFE), cross-linked polyethylene (PEX), and various nylons, such as nylon 6, nylon 66, nylon 6/6-6, nylon 6/9, nylon 6/10, nylon 6/12, nylon 11, or nylon 12, and combinations of the foregoing. Where strength and durability are important factors, the tool 100 may be made from metals and galvanized metals, including aluminum, copper, brass, and stainless steel and alloys thereof. These metals are suitable for use in connection both hot and cold-water transfer in residential, commercial and industrial applications. These metals also resist the corrosive effects of water and other chemicals. The material comprising the tool 100 preferably is neither flexible, conformable or deformable in order to create a rigid flange 120 against which faucet 10A, 10B, 10C or 10 D interior components, such as seat 18 and spring 20, can impart a resistive force. In one embodiment of the invention, the tool 100 is comprised of UHMWPE for rigidity and durability.

With continuing reference to FIGS. 3, 4, 5 and 6, it now will be appreciated that the body 112 is hollow, forming an interior aperture or hollow throughfare, thus creating an interior conduit or channel 122 for the purpose of receiving a screwdriver or other implement having a shaft on which to wield the tool 100. In one embodiment of the invention, the channel 122 is co-extensive with a longest dimension, or length, $L_B$ of the body 112 and is formed centrally therethrough. It will be appreciated that the channel 122 may be offset from center for certain applications and faucets where the valve works or replacement parts therein are offset within the faucet 10A, 10B, 10C, or 10D.

The channel 122 forms a diameter that is substantially uniform throughout the length $L_B$ of the body 112 and is sized to receive a common implement having a shaft, such as a screwdriver 130, for the purpose of wielding the tool 100, as shown in FIG. 6. It now will be appreciated that the inner diameter $D_{FEI}$ of the first end 114 and the inner diameter $D_{SEI}$ of the second end 116 are approximately equal for the purpose of receiving an implement for handling the tool 100 during repair, replacement and installation of replacement components of a plumbing faucet. It now also will be appreciated that the channel 122 may comprise a cross-section having any shape to accommodate the shaft of an appropriate implement for wielding the tool 100, including circular, hexagonal, octagonal, star-shaped, triangular, square, rectangular or other shape. In one embodiment of the invention, the cross-sectional shape of the channel 122 is circular for receiving a screwdriver. However, it will be appreciated that the channel could be star-shaped for receiving a star-shaped wrench, or hexagonal or octagonal for receiving an Allen wrench, or any other shape adapted to receive the implement for wielding the tool 100. It also will be appreciated that a circular shape may also accommodate a star-shaped wrench or Allen wrench. In one embodiment of the invention, the cross-sectional shape of the channel 122 is adapted to fit the shaft of the implement upon which the tool 100 is to be wielded in order to provide a secure fit between the tool 100 and the implement and to minimize slippage of the tool 100 on the implement.

The body 112 of the tool 100 may comprise an integral one-piece construction wherein the first end 114 is machined down to the desired outer diameter $D_{FEO}$ for the application. In another embodiment of the invention, the tool 100 is made from separate components that are secured together to create a unified rigid body 112, wherein the first end 114 is formed to the desired outer diameter $D_{FEO}$ for the application and the second end 116 is formed to the desired outer diameter $D_{SEO}$ for the application. In yet another embodiment, the first end 114 and the second end 116 are two separate components, wherein the first end 114 is formed to the desired outer diameter $D_{FEO}$ for the application and the second end is formed to the desired outer diameter $D_{SEO}$ for the application, and wherein the first end 114 is telescopically receivable within the second end 116.

It now will be appreciated that the body 112 may also be comprised of separate components wherein the first end 114 and the second end 116 are formed separately. For example, in certain applications, it may be advantageous for the first end 114 to be comprised of a separate material than the material from which the second end 116 is formed. The first end 114 may be made from a material possessing properties different from or complementary to the properties of the material from which the second end 116 is made. In this instance, it may be advantageous to form the first end 114 from a material possessing properties of strength, rigidity and anti-slip properties, while the second end 116 would be formed from a material possessing strength and rigidity.

Figure 4:
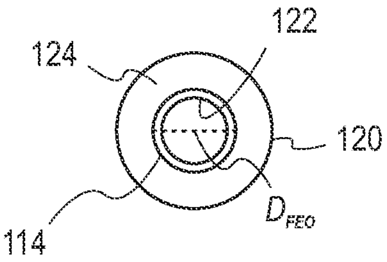
FIG. 4 shows a cross-sectional view of the illustrative plumbing tool of FIG. 3 taken along cross-section line 4-4.
Figure 5:
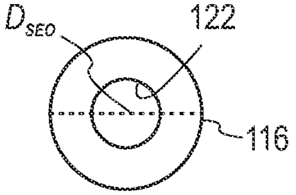
FIG. 5 shows a cross-sectional view of the illustrative plumbing tool of FIG. 3 taken along cross-section line 5-5.

With continuing reference to FIGS. 2 and 4, in one embodiment of the invention, the flange 120 of the body 112 optionally may be covered or wrapped with a coating or cap 124 made from a material that creates surface friction between the flange 120 to keep the flange in cooperative engagement as the faucet components, such as seat 18 and spring 20, are supported for installment in the faucet 10A, 10B, 10C, or 10D. The coating or cap 124 assists the user in securely holding or gripping the first end 114 of the body 112 of the tool 100, as the seat 18 and spring 20 are moved into proper aligned placement during operation of the tool 100. Suitable materials for creating the coating or cap 124 include silicone-base materials, including dimethicone, aminosilicones, siloxysilicates and anionic silicones. It will be appreciated that the coating or cap 124 may cover the flange 120 and/or completely or partially enclose the exterior surface the first end 114, or even cover the entire exterior surface of the tool 100.

The dimensions of the tool 100 are variable depending upon the application. In one embodiment of the invention, the body 112 of the tool has a length $L_B$ that is approximately 2.5 inches long, where the first end 114 has a length $L_{FE}$ that is approximately 0.5 inches (approximately 1.27 centimeters), and the second end 116 has a length $L_{SE}$ that is approximately 2 inches (approximately 5.08 centimeters). The length $L_{FE}$ of the first end 114 should at least supply sufficient space to apply a compressive force for a purpose yet to be described. It will be appreciated that the overall length $L_B$ of the body 112, and the length $L_{FE}$ of the first end 114 and the length $L_{SE}$ of the second end 116 may vary depending upon several factors, including the size of the faucet requiring repair, the size of the screwdriver 130 or other implement used to wield the tool 100, and the particular application at issue, for example, whether commercial, industrial or residential. The differential of the length $L_{FE}$ of the first end 114 to the length $L_{SE}$ of the second end 116 is a ratio ranging from about 0.1 to about 0.5. In one embodiment of the invention, the differential between the length $L_{FE}$ of the first end 114 to the length $L_{SE}$ of the second end 116 is a ratio is about 0.2.

Although the size of the channel 122 may vary, it will be appreciated that the diameter of the channel 122 should be sized to receive an implement on which the tool 100 is wielded so as to provide a secure fit between the tool 100 and the implement. This minimizes the risk of slippage of the tool 100 on the shaft of the implement, particularly in wet conditions such as plumbing applications. In one embodiment of the invention, the channel 122 has a diameter of approximately 0.25 inches (approximately 0.635 centimeters) along the entire length $L_B$ the body 112. In another embodiment of the invention, the diameter of the channel is about 5⁄16 inches 0.3125 inches (0.79 cm). In one embodiment of the invention, the outer diameter $D_{FEO}$ of the first end 114 is approximately 0.3 (approximately 0.762 centimeters), and the outer diameter $D_{SEO}$ of the second end 116 is approximately 0.5 (approximately 1.27 centimeters).

The dimensions of the tool 100, and the ratios of dimensions and lengths of the components of the tool 100, are helpful to achieving the desired functionality for the application. The overall width must be appropriate to permit the full force of the tool 100 on the seat 18 and spring 20, or other faucet interior component. Reducing the size of the tool 100 would reduce the full force, and the effectively aligned force, on the seat 18 and spring 20 during replacement. Enlarging the tool 100 would interfere with alignment of the components due to the seat 18 and spring 20 being close to the inner wall of the interior of the faucet 10A, 10B, 10C or 10D. The channel 122 must allow for the free movement along the screwdriver or other tool on which the tool 100 is loaded, while simultaneously supplying a substantially secure fit to minimize slippage. The overall length $L_B$ advantageously may permit the universal use between various tools, for example, including both #1 Phillips and #2 Phillips screwdrivers. A typical #1 Phillips screwdriver is 1 inch shorter than a #2 Phillips screwdriver. For example, the tool 100 could be used in conjunction with a #1 Phillips head screwdriver with a shaft diameter of 0.185 inches or a #2 Phillips head screwdriver with a shaft diameter of 0.245 inches, depending on the size of the seat and spring. It also is important to use an appropriately sized screwdriver or other tool when wielding the tool 100 to ensure a snug fit of the seat 18 and spring 20 on the end of the screwdriver. This snug fit will assure proper alignment of the seat 18 and spring 20, or other replacement component, within the faucet. The smaller #1 Phillips screwdriver should be used for the smaller seats 18 and springs 20. Larger seats and springs may necessitate a larger #2 screwdriver, or other alternately-sized shaft-bearing implement.

Turning now to FIGS. 7 and 8, the operation and method of use of the tool 100 are explained. The foregoing detailed description is incorporated into the discussion of the operation and method of use of the tool 100. The correct screwdriver 130 or other implement must be assessed and selected to match the size of the seat 18 and spring 20 or plumbing component to be repaired or replaced. In addition to screwdrivers, the tool 100 could be used with a variety of tools found in the home or garage or the typical plumber's tool bag. For instance, an appropriately sized Allen wrench or similarly shaped star wrench could be used in conjunction with the tool 100. It is important to choose a size of tool that will securely hold the seat 18 and spring 20 in place during replacement and install of component parts and that is of sufficient length to accommodate the tool 100. Any garage tool with a substantially straight shaft could be used if it will fit inside the tool 100 and also hold the seat 18 and spring 20, or O-rings, washers or other plumbing parts, in place during replacement. These components should fit snugly on the screwdriver 130 so that they will remain in the correct position during the installation. First, the tool 100 is placed over the head 132 of the shaft 134 of the screwdriver 130, with the first end 114 positioned proximal the handle 136 of the screwdriver. Next, the seat 18 is placed over the tip 132 of the screwdriver 130, followed by the spring 20. The seat 18 and spring 20 are situated on the shaft 134 at the tip 132 of the screwdriver 130 adjacent the second end 116 of the tool 100. The proper location for the seat 18 and spring 20 is identified inside the faucet 10A, 10B, 10C or 10D. With the tool 100, place the seat 18 and spring 20 simultaneously in their proper location in the faucet 10A, 10B, 10C or 10D. The tool 100 permits the user to actually feel when the seat 18 and spring 20 are accurately positioned in their proper location inside the faucet 10A, 10B, 10C, 10D. With the seat 18 and spring 20 positioned, hold the tool 100 with the seat 18 and spring 20 in place at the first end 114 proximal the flange 120, as the screwdriver 130 is withdrawn. Holding the tool 100 inward against the seated seat 18 and spring 20, by applying a gentle force against the flange 120, keeps the seat and spring in proper aligned placement within the faucet as the screwdriver 130 is withdrawn. Pulling the screwdriver 130 out of the faucet 10A, 10B, 10C or 10D, without holding the tool 100 inward, will withdraw the seat/spring from their home. The flange 120 enables the user to firmly grasp the tool 100 and apply the force necessary to hold the seat 18 and spring in proper aligned placement within the faucet 10A, 10B, 10C or 10D, while withdrawing the screwdriver 130 from the faucet. Upon removal of the screwdriver 130, the seat 18 and spring 20 will now be properly positioned and the faucet 10A, 10B, 10C or 10D ready for reassembly and use.

It now will be appreciated that the present invention presents a novel tool for replacing interior components of a plumbing faucet, such as a seat and spring, O-rings and seats, O-rings, washers and other interior components, and is adaptable for use in a variety of faucet assemblies. The present invention may eliminate the need to supply multiple tools for maintenance of a faucet. The present invention facilitates proper alignment and installation of the new components into the confined interior space of the faucet. Moreover, the present invention simply slides over the shaft of a screwdriver for implementation, thus eliminating the requirement for tracking an additional tool when repairing the faucet. There are no moving parts on the tool itself and no springs, handles or other components that deteriorate or break. The tool is universal, as it can be used with multiple sizes interior faucet components, such as seats and springs, and with multiple sizes of screwdrivers and other common tools.

The invention has been described above both generically and with regard to specific embodiments. Although the invention has been set forth in what has been believed to be preferred embodiments, a wide variety of alternatives known to those of skill in the art can be selected with a generic disclosure. Changes may be made in the combination and arrangement of the various parts, elements, steps and procedures described herein without departing from the spirit and scope of the invention as defined in the following claims.

I claim:

1. A plumbing tool for replacing or installing interior components of a plumbing faucet, the plumbing tool comprising:

a hollow body, the body forming a first end and a second end, wherein:

the first end has an inner diameter $D_{FEI}$ and an outer diameter $D_{FEO}$, and the second end has an inner diameter $D_{SEI}$ and an outer diameter $D_{SEO}$ and wherein the outer diameter $D_{FEO}$ of the first end is smaller than the outer diameter $D_{SEO}$ of the second end, thus forming a flange proximal the first end, the flange being configured to apply a force, without moving parts of the plumbing tool, against the interior components of the plumbing faucet;

the differential between the outer diameter $D_{FEO}$ of the first end and the outer diameter $D_{SEO}$ of the second end is a ratio ranging from about 0.2 to about 0.8;

the hollow body is formed from polyethylene (PE), polystyrene (PS), polypropylene, polyvinyl chloride (PVC), polyester, nylon, thermoplastic olefins, santoprene, acrylonitrile butadiene styrene (ABS), acetals, polyoxymethylene, polyvinyl chloride, ultra-high molecular weight polyethylene (UHMWPE), high density polyethylene (HDPE), polytetrafluoroethylene (PTFE), cross-linked polyethylene (PEX), and nylons, nylon 6, nylon 66, nylon 6/6-6, nylon 6/9, nylon 6/10, nylon 6/12, nylon 11, or nylon 12, and combinations of the foregoing;

the hollow body forms an interior channel for the purpose of receiving an implement for wielding the plumbing tool;

the hollow body has a length $L_B$ and the channel is co-extensive with the length $L_B$ of the hollow body; and the first end has a length $L_{FE}$ and the second end has a length Ls and the ratio of the length $L_{FE}$ of the first end to the length $L_{SE}$ of the second end ranges from about 0.1 to about 0.5 and accommodates the application of force to the flange.

2. The plumbing tool of claim 1 wherein the inner diameter $D_{FEI}$ of the first end and the inner diameter $D_{SEI}$ of the second end are approximately equal.

3. The plumbing tool of claim 2 wherein the hollow body comprises an integral one-piece unit.

4. The plumbing tool of claim 1 where the first end and the second end are comprised of different materials.

5. The plumbing tool of claim 4 wherein the flange is covered or wrapped with a coating or a cap made from a material that enhances surface friction against the flange and that enhances cooperative engagement with the interior components of a plumbing faucet during replacement or installation of the interior components.

6. The plumbing tool of claim 5 wherein the coating or cap are made from silicone-base materials, including dimethicone, aminosilicones, siloxysilicates and anionic silicones.

7. A method for replacing and/or installing interior components of a plumbing faucet, the method comprising:

selecting a plumbing tool having a body, the body forming a first end and a second end, wherein the first end has an inner diameter $D_{FEI}$ and an outer diameter $D_{FEO}$, and the second end has an inner diameter $D_{SEI}$ and an outer diameter $D_{SEO}$ and wherein the outer diameter of the first end $D_{FEO}$ is smaller than the outer diameter of the second end $D_{FEO}$, thus forming a flange proximal the first end, the flange being configured to apply a force, without moving parts of the plumbing tool, against the interior components of the plumbing faucet, wherein the interior components comprise a seat and a spring;

selecting an implement for receiving the plumbing tool, the implement having a shaft; and placing the plumbing tool over the shaft of the implement with the flange positioned proximal a handle of the implement;

placing the interior components of the plumbing faucet over the shaft of the implement;

situating the seat and spring proximal the second end of the plumbing tool;

inserting the seat and spring into the proper location in the plumbing faucet with the plumbing tool supported on the implement;

holding the plumbing tool in place while withdrawing the implement from the plumbing faucet; and applying a force against the flange and holding the plumbing tool inward within the plumbing faucet while withdrawing the implement from the plumbing faucet.

8. A plumbing tool for replacing or installing interior components of a plumbing faucet, the plumbing tool comprising:

a hollow body, the hollow body forming a first end and a second end, wherein:

the first end has an inner diameter $D_{FEI}$ and an outer diameter $D_{FEO}$, and the second end has an inner diameter $D_{SEI}$ and an outer diameter $D_{SEO}$ and wherein the outer diameter $D_{FEO}$ of the first end is smaller than the outer diameter $D_{SEO}$ of the second end, thus forming a flange proximal the first end, the flange being configured to apply a force, without moving parts of the plumbing tool, against the interior components of the plumbing faucet;

the differential between the outer diameter $D_{FEO}$ of the first end and the outer diameter $D_{SEO}$ of the second end is a ratio ranging from about 0.2 to about 0.8;

the hollow body is formed from polyethylene (PE), polystyrene (PS), polypropylene, polyvinyl chloride (PVC), polyester, nylon, thermoplastic olefins, santoprene, acrylonitrile butadiene styrene (ABS), acetals, polyoxymethylene, polyvinyl chloride, ultra-high molecular weight polyethylene (UHMWPE), high density polyethylene (HDPE), polytetrafluoroethylene (PTFE), cross-linked polyethylene (PEX), and nylons, nylon 6, nylon 66, nylon 6/6-6, nylon 6/9, nylon 6/10, nylon 6/12, nylon 11, or nylon 12, and combinations of the foregoing; and the first end and the second end are comprised of different materials.

9. The plumbing tool of claim 8 wherein the hollow body forms an interior channel for the purpose of receiving an implement for wielding the plumbing tool.

10. The plumbing tool of claim 9 wherein the hollow body has a length $L_B$ and the channel is co-extensive with the length $L_B$ of the hollow body.

11. The plumbing tool of claim 10 wherein the first end has a length $L_{FE}$ and the second end has a length $L_{SE}$ and the ratio of the length $L_{FE}$ of the first end to the length $L_{SE}$ of the second end ranges from about 0.1 to about 0.5 and accommodates the application of force to the flange.

12. The plumbing tool of claim 11 wherein the inner diameter $D_{FEI}$ of the first end and the inner diameter $D_{SEI}$ of the second end are approximately equal.

13. The plumbing tool of claim 12 wherein the hollow body comprises an integral one-piece unit.

14. The plumbing tool of claim 8 wherein the flange is covered or wrapped with a coating or a cap made from a material that enhances surface friction against the flange and that enhances cooperative engagement with the interior components of a plumbing faucet during replacement or installation of the interior components.

15. The plumbing tool of claim 14 wherein the coating or cap are made from silicone-base materials, including dimethicone, aminosilicones, siloxysilicates and anionic silicones.

* * * * *